United States Patent [11] 3,607,702

| [72] | Inventor | Wolfgang Haller<br>5400 Pooks Hill Road, Apt 912, Bethesda,<br>Md. 20014 |
|---|---|---|
| [21] | Appl. No. | 702,873 |
| [22] | Filed | Feb. 5, 1968 |
| [45] | Patented | Sept. 21, 1971 |

[54] ELECTROCHEMICAL APPARATUS
8 Claims, 3 Drawing Figs.

[52] U.S. Cl. .................................................. 204/195,
204/1 T
[51] Int. Cl. ....................................................... G01n 27/46
[50] Field of Search ........................................... 204/1.1,
195, 195.1; 106/52–54

[56] References Cited
UNITED STATES PATENTS

| 2,215,039 | 9/1940 | Hood et al. .................. | 106/54 |
| 3,338,812 | 8/1967 | Dworak et al. ............... | 204/195 |

OTHER REFERENCES

McDonnell et al., " Analytical Chem.," Vol. 33, No. 11, Oct. 1961, pp. 1552–1554.
McDonnell et al., " Analytical Chem.," Vol. 33, No. 11, Oct. 1961, pp. 1554–1555.

*Primary Examiner*—T. Tung

ABSTRACT: An electrolytic junction membrane for the measuring of ionic potential in electrolytes is formed of a glass body having a continuous interconnected system of pores of an average, and preferably substantially uniform, pore-diameter between about 125 A. and 1,700 A. and preferably not above 250 A., and wherein the ratio of pore-volume to glass-volume is between about 1:2 and 2:1; and a method of producing such glass body by heating glass above its melting point so as to form two distinct phases therein, solidifying the glass while maintaining said distinct phases, and removing one of the two distinct phases by leaching.

|←1 μ→|

ELECTROCHEMICAL APPARATUS

A nonexclusive license to make and use for governmental purposes the invention described herein has been granted to the United States of America.

CROSS-REFERENCES TO RELATED APPLICATIONS

The present application is a continuation-in-part of my copending application Ser. No. 507,092, filed Nov. 10, 1965, now U.S. Pat. No. 3,549,524, and entitled "Porous Material and Method of Making and Using the Same" the entire contents of which are included herein by reference.

BACKGROUND OF THE INVENTION

This invention relates to electrochemical analytical devices and particularly to a new and improved liquid junction structure used in the determination of ion concentrations, and methods for making such structures.

The use of electrochemical devices for determining and measuring of concentration of ions in solutions is now commonplace. In the usual form, such a device consists of an ion-sensitive electrode such as for instance a pH sensitive glass electrode which is immersed into the solution whose ion concentration is to be measured. When the ion-sensitive electrode is immersed into the solution, a potential develops between the solution and the electrode which is related to the ionic concentrations of the solution. Essentially, the ion-sensitive electrode and the solution constitute the so-called half cell and the developing potential is called the half-cell potential of the ion-sensitive electrode. To measure this half-cell potential, it is necessary to connect the ion-sensitive electrode and the solution to an electric measuring circuit. To do this, it is necessary to bring the solution into contact with another electrode, whereby the second electrode, also called reference electrode should develop a constant half-cell potential which is essentially unaffected by concentration changes in the test solution. Usual practice employs a substantially reversible electrode system such as a calomel electrode which is surrounded by an electrolyte such as for instance a saturated KCl solution which in turn contacts the test solution. The junction between test solution and saturated KCl solution is called liquid junction and in many other combinations beyond the given example constitutes an important principle utilized in electrochemical devices. Generally one provides a constriction in the liquid path between two half cells which reduces the liquid flow between the half cells to a minimum, yet permits electrical conduction through the adjoining liquids.

A variety of constructions are in use. For instance, it has been known to use ill-fitting ground gloss stoppers between the half cells. More recently glass capillaries stuffed with cotton, asbestos or glass fibers have been used while some use of intentionally cracked glass membranes or porous ceramic bodies has been reported.

In many applications of liquid junctions, such as in the measurement of the pH of liquid, low electrical resistance through the liquid junction is desirable in order to obtain optimum electrical performance of the potential sensing instruments. This low electrical resistance can, however, not be simply gained by increasing the junction cross section. The resulting enhanced flow of electrolyte not only dilutes the unknown electrolyte in the respective part of the measuring assembly but also quickly exhausts the supply of electrolyte in the other half cell.

Since the hydraulic conduction through a capillary decreases at a faster rate than the electric conduction when decreasing the capillary diameter it has been found that beneficial results are obtained by replacing a single liquid junction with a multiplicity of parallel junctions with smaller cross sections as provided by the channels of a porous material. A lower limit for the diameter of the individual channels, however, is imposed by the appearance of osmotic activity when the pores approach the size of molecular species in the electrolytes, i.e. about 100 A. While ceramic materials currently are being used for such critical applications they suffer from such disadvantages as too wide a pore distribution and too low pore volume.

SUMMARY OF THE INVENTION

The present invention proposes an electrolytic junction membrane adapted for the measurement of ionic potentials in electrolytes and consisting essentially of a glass penetrated by a continuous interconnected system of pores having a volume ratio of glass to pore space of between about 1:2 and 2:1 and an average pore diameter of between about 125 A. and 1700 A.

Preferably, the pores are of substantially uniform size distribution and the glass is a borosilicate glass.

The present invention also includes an apparatus for measuring an ionic potential between electrolytes which consists of two chambers which are separated by the above-described glass membrane, filled with electrolytes and the latter in contact with suitable, conventional electrodes.

The electrolytic junction membrane described above may be produced by melting a glass having a composition which lies in a limited region of the ternary system $RO \cdot B_2O_3 \cdot SiO_2$, wherein R is an alkali metal; heating said molten glass so as to separate the latter into at least a silica-rich phase and a boric oxide rich phase, said heating being carried out for a time and at a temperature sufficient to provide pores defined by the relationship $$r^n = k \, t \, e^{1m/T}$$

where $r$ = pore radius (A.); $k$, $m$ and $n$ are constants; $t$ = time (hours); and $T$ = temperature (°K.); cooling of the glass to below its melting point; contacting the thus solidified glass with an acidic medium to substantially remove the boric oxide-rich phase substantially without destroying the silica-rich phase phase; contacting the silica-rich phase with a solvent for colloidal silica to provide substantially colloidal silica-free pores therein; and drying the thus obtained silica-rich residual glass phase to provide a porous siliceous medium.

The novel features which are considered as characteristic are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

In FIG. 1, the relationship of the heat treating operation versus the controlled pore may be generally expressed by the equation $r^n = k \cdot t \cdot e^{1m/T}$, wherein $r$ denotes the pore radius in Angstroms (A.); $k$, $m$, and $n$ are constants; $t$ denotes the treating time in hours; and $T$ denotes the treating temperature in °K.;

DESCRIPTION OF THE PREFERRED EMBODIMENTS

Figure 1:
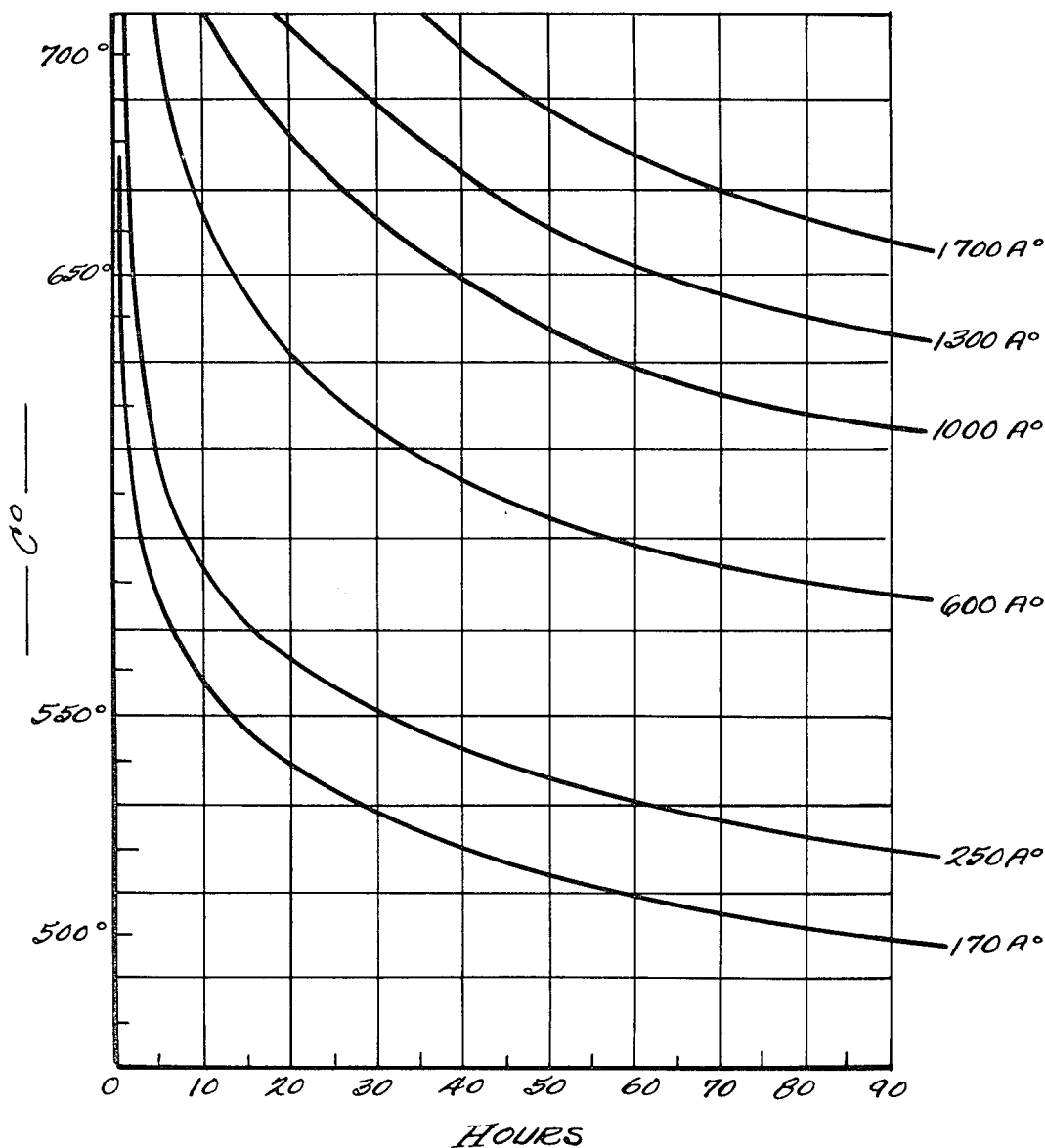
FIG. 1 is a graph showing the relationship of the heat treatment operation versus the controlled pore diameter.

According to the present invention, liquid junctions suitable for the thus described and other purposes may be provided which comprise glass membranes with substantially uniform and size-controlled open pores.

Liquid junctions may be made in accordance with the present invention which have a high pore volume so as to provide maximum efficiency at minimum size, yet without serious or substantial impairment of the mechanical strength of the membrane.

The novel liquid junction of this invention can be made to furthermore have pores which are sufficiently small to prevent passage of bacteria and virus, i.e. below about 200 A., which is important for use of, for instance, pH sensors in fermentation processes or in making pharmaceuticals.

For these and other purposes a pore size of between about 100 and 250 A. is preferred. This size range is generally too small to permit passage of virus, and too large to cause osmotic activity.

To achieve the foregoing and other objects, the electrochemical apparatus of this invention contains a liquid junction made of a porous glass medium having closely controllable pore size and narrow pore size distribution.

In practicing the instant invention, a porous medium is prepared from a base glass having a composition which lies in a limited region of the ternary system $RO \cdot B_2O_3 \cdot SiO_2$ wherein said region comprises compositions which will separate by heat treatment into at least two phases, one of which is easily decomposable and the other substantially undecomposable. The term RO means any of the alkaline earth, alkali metal or heavy metal oxides wherein RO can be $Li_2O$, $Na_2O$, $K_2O$, CaO, BaO, MgO, BeO, SrO, ZnO or PbO, or any combination thereof. It has also been found that the advantages of this invention can be secured by replacing the silica with, for instance, germanium ($GeO_2$). Advantageously, the base glass composition can, for instance, be of the type described in U.S. Pat. Nos. 2,106,744 and 2,215,039. It is important that the mixture of oxides chosen displays an immiscibility gap, i.e., that the melt of the oxides, when above a predetermined temperature, is a substantially homogeneous liquid and, when below said predetermined temperature, segregates into at least two immiscible liquids. In addition to the mixture of oxides chosen displaying such an immiscibility gap, it is also important that the volume ratio of the phases and thus the pore space ratio after leaching be between 1:2 and 2:1, i.e., approximately equal and that the chemical durability of each phase differs substantially enough to permit selective leaching. Representative suitable mixtures of oxides include compositions wherein the base glass silica is present in amounts ranging from 50 to 83 weight percent, the RO, e.g. soda, potash, lithia, etc., is present in amounts ranging from about 2 to 10 weight percent and the boric oxide is present in amounts from about 8 to 48 weight percent.

A critical feature of the instant invention resides in the heat treatment of the mixture of oxides chosen. It has been found that the pore size and the narrow distribution thereof in the resulting material can effectively be controlled and is dependent on the thermal history of the glass. The dependence of the pore size and the distribution thereof on the thermal history of the glass has been found to be conveniently expressed according to the relationship where $r^n = k \, t \, e^{1 = m/T}$
$k, m$ and $r$ = pore radius (A.)
$n$ = constants
$T$ = treatment temperature (Kelvin°), and
$t$ = time (hrs.)

It has been found that generally the treatment can be effected at a temperature ranging from 400° to 950° C. (673° to 1223° K.) for a period ranging from about 2 hours to 4 weeks although it will be recognized that the upper ranges of time and the lower ranges of temperature generally are limited only by practical considerations.

It should also be recognized that a pore size of desired distribution can be achieved by casting, melt spinning or flame-blowing the mixture of oxides, the time and temperature relationship defined above being maintained in such physical manipulations. Preferred pore sizes range from 125 to 1700 A., and preferably the pores are of substantially uniform size.

In the novel method of this invention, the glass, after undergoing a heat treatment in accordance with the above equation, is shaped to a preselected configuration. In case that the shaping method employed produces a skin of changed composition on the article, it may be necessary to remove this skin by abrasion or etching. The cooled glass, formed into any desired shape is then treated to retain at least one of the microphases with the concomitant removal of, substantially, the remaining microphases. Ordinarily, the silica-rich phase is retained while the silica-poor, or boron-rich phase is removed by leaching with an acid. It has been found that the rigid pores of the resulting silica-rich phase skeleton are substantially filled with colloidal silica which is a decomposition product of the removed microphase. After washing the rigid, porous skeleton in an aqueous solution, the skeleton is treated with a solvent for the colloidal silica, preferably, a dilute solution of hydrofluoric acid or sodium hydroxide, for a time sufficient to remove the colloidal silica without substantial attack of the skeleton itself. Ordinarily, the colloidal silica solvent treatment time will range from about 1 to 4 hours. Thereafter, the skeleton can be dried and the dried skeleton thus comprises a rigid matrix provided with a continuous system of intercommunicating pores substantially free of contaminants.

The following examples are given as illustrative of the present invention, however, without limiting the invention to the specific details of the examples.

An alkali borosilicate glass composition exhibiting an immiscibility gap as defined hereinbefore was produced by mixing in a ball mill analytical grade sodium carbonate, boric acid and ground quartz in a proportion equivalent to a $Na_2O$ to $B_2O_3$ to $SiO_2$ weight ratio of 6.9 to 25.7 to 67.4, respectively. The mixture was fused in an electric furnace at 1,200° C. until the major amount of $H_2O$ and $CO_2$ was expelled. The temperature was then elevated to 1,450° C. and maintained while stirring for 5 hours. The melt was a substantially homogeneous mixture. Thereafter, the melt was chilled by pouring onto a cold steel plate. A chemical analysis of the glass gave 6.0% $Na_2O$, 25.6% $B_2O_3$ and 68.4% $SiO_2$, by weight.

11 samples of glass made in accordance with the above procedure were heat treated in an electric muffle furnace with thermocouple readout and proportional control. The treatment times and temperatures varied as indicated in Table I, below. The appearance of the heat-treated glasses depended on their thermal history and it ranged from completely clear over bluish-yellowish opalescent to a completely opaque white.

The 11 samples of heat-treated glass were crushed into small pieces in a steel mortar and fractionated by screening on stainless steel screens. Unless otherwise indicated, fraction ranging in size between 0.03 and 0.015 of grain diameter (50–100 mesh U.S.S. ASTM sieves) were retained for further processing.

The silica-poor phase in each of the 11 samples of glass was removed by contacting the fractionated glass particles with 3 N HCl at 50° C. for a period of 6 hours. This contact also serves to remove any iron contamination picked up from the mortar. The acid solution was decanted and the fractionated glass particles subjected to a second acid leaching treatment for a period of 18 hours. The ratio of original glass powder to acid was maintained, essentially, at 50 grams to 400 milliliters. After the acid leach treatment the discrete particles of glass were washed with water until the supernatant liquid was neutral and free of visible colloidal silica. Inasmuch as the silica-poor phase also contains silica in addition to water-soluble sodium borate, this silica is precipitated during the leaching process with the greater part thereof remaining in the pores of the silica-rich particles. To remove the colloidal silica precipitate from the pores of the silica-rich particles and thus provide an effective porous medium in accordance with the instant invention, the particles are contacted with a solvent for the colloidal silica. The particles were contacted with a 0.5 N NaOH solution at 25° C. for 2 hours. Thereafter, the glass particles were washed with water until neutral, stirred with cold 3

N HCl for 2 hours and extracted with cold water for 20 hours. The essentially colloidal silica-free particles were then washed with boiling water for 4.5 hours in an extractor and vacuum dried at 100° C. for 24 hours.

Subsequently, mercury intrusion pore size measurements were determined and calculated according to the method described in ASTM Bull, 39 (Feb. 1959) by N. M. Winslow and J. J. Shapiro.

| Sample | Temp. (° C.) | Time (hrs.) | Appearance of glass block 1 cm. thick | Pore size, A. |
|---|---|---|---|---|
| 1 | 564 | 4 | Transparent | 125 |
| 2 | 564 | 8 | do | 150 |
| 3 | 564 | 16 | do | 200 |
| 4 | 600 | 4 | do | 175 |
| 5 | 600 | 8 | do | 250 |
| 6 | 640 | 16 | do | 575 |
| 7 | 661 | 16 | Opaque | 750 |
| 8 | 684 | 16 | Opaque white | 950 |
| 9 | 708 | 4 | Opaque opalescent | 625 |
| 10 | 708 | 8 | Opaque white | 875 |
| 11 | 708 | 16 | do | 1,250 |

These data and similar data form the graph shown in FIG. 1 and it will be apparent that the family of curves therein can best be expressed by the relationship $$r^n = k\, t\, e^{m/T}$$

where $k$, $m$ and $n$ = constants, $r$ = the pore radius (A.), $t$ = time (hours), and $T$ = treatment temperature (°K.)

The above equation thus makes it possible to provide heat treatment schedules which result in microheterogeneous glasses exhibiting predetermined microphase dimensions, i.e., having a controlled pore size of narrow distribution.

It will be recognized, of course, that the terms in the above equation can vary according to a particular type of base glass composition chosen and it will be obvious that the choice of any particular base glass composition will depend on a number of easily ascertainable factors determinable by those skilled in the art. Such considerations, of course, can include the ultimate use of the liquid junction, the material with which it comes into contact, the temperature to which it is exposed, etc.

After the heat treatment constants of the particular base glass had been determined as described above a base glass rod of 4 mm. diameter, 3 mm. long was heat-treated 16 hours for 570° C. This, as shown in FIG. 1, will lead to a pore size of about 250 A. Then the rod was leached as described above. The rod was inserted with a silicon-rubber collar into a glass tube. Electrolyte leakage was less than 0.01 cm.³/day at 20 cm. head and electrical resistance was 300 ohms. A ceramic diaphragm of similarly low leakage, showed an electrical resistance of 2,000 ohms. No spurious EMF was detected as it was when using a commercially available porous borosilicate glass ("thirsty glass") having too small a pore size.

Figure 2:
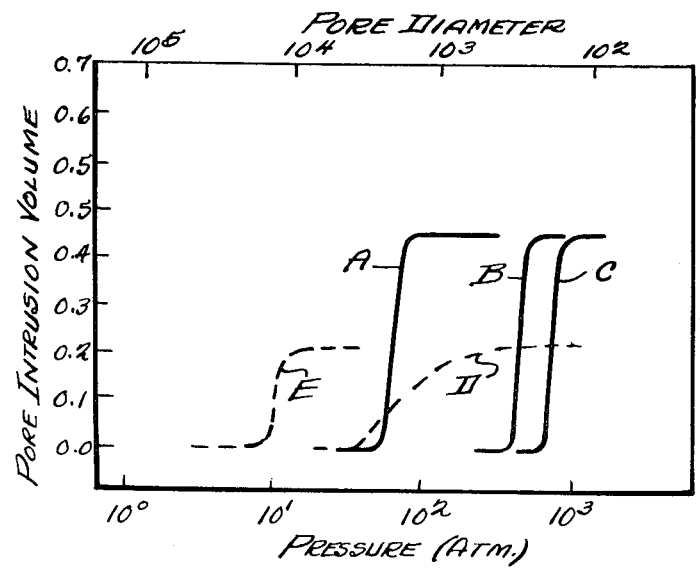
FIG. 2 is a graph showing the pore size distribution of porous media made in accordance with the invention and compared with conventional ceramic porous media.
Figure 3:
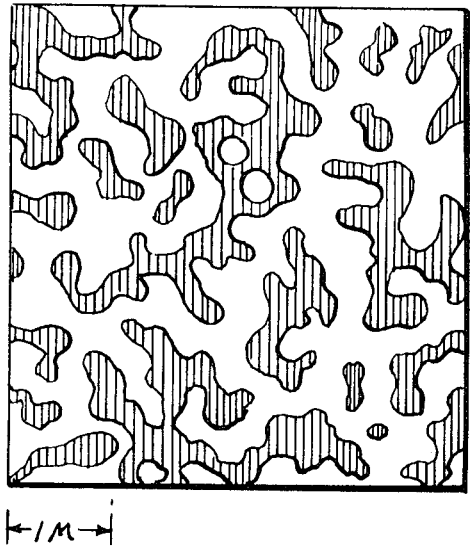
FIG. 3 is a partial cross-sectional view of a porous medium made in accordance with the present invention, in which the crosshatched portions denote glass, and the portions therebetween pore spaces.

Three samples of porous glass prepared in accordance with the method described exhibited average pore diameters of 170 A., 260 A. and 1700 A. measured by mercury intrusion. The free pore space of the glass samples was 47–53 percent independent of pore size. The integral pore size distribution curves of these glasses as determined by mercury intrusion technique based on a wetting angle of 135° as outlined in ASTM Bull., 39, Feb., 1959 (referred to above) are shown as curves C, B and A, respectively, in FIG. 2. The average pore size of the glass is defined as the pore diameter which was penetrated when half of the total volume available for mercury became filled. The pore size distribution of glasses made in accordance with the invention is compared with the pore size distribution of conventional ceramic bodies shown as curves D and E in FIG. 2. As can be seen, ceramic bodies exhibit a substantially broader pore distribution. 95 percent of the pore space of the porous glasses lies within less than ±20 percent of their average pore size while for the ceramic bodies E and D, these figures are ±30 and ±87 percent, respectively.

A preferred composition of the electrolytic junction membrane of the present invention consists of about 85–100 percent silica, 0%–15% alkali metal oxide and 0%–15% boric oxide, all percentages by weight.

It will be understood that each of the elements described above, or two or more together, may also find a useful application in other types of electrochemical apparatus differing from the types described above.

While the invention has been illustrated and described as embodied in an electrolytic junction membrane and a method of making the same, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An apparatus for measuring ionic potentials between electrolytes and comprising, in combination, two chambers separated by a membrane consisting essentially of glass penetrated by a continuous interconnected system of pores having a volume ratio of glass to pore space of between 1:2 and 2:1 and an average pore diameter of between about 125 A. and 1700 A., said chambers being adapted to be filled with electrolytes; and electrode means extending into said chambers, respectively, for contacting the electrolyte therein.

2. The apparatus of claim 1 wherein 95 percent of the pore volume is composed of pores deviating by less than ±20% from average pore size.

3. The apparatus of claim 1 wherein said membrane consists of borosilicate glass.

4. The apparatus of claim 3, wherein said borosilicate glass comprises 85%–100% silica, 0%–15% alkali metal oxide and 0%–15% boric oxide.

5. The apparatus of claim 4, wherein said alkali metal is sodium.

6. The apparatus of claim 1 wherein one of the electrodes is an ion-selective electrode.

7. The apparatus of claim 1 wherein one of the electrodes is a reference electrode.

8. The apparatus of claim 1, wherein said average pore diameter is below 250 A.